United States Patent
Akema et al.

(10) Patent No.: US 6,699,935 B2
(45) Date of Patent: Mar. 2, 2004

(54) RUBBER COMPOSITION

(75) Inventors: Hiroshi Akema, Tokyo (JP); Toshihiro Tadaki, Tokyo (JP); Yoshiyuki Udagawa, Tokyo (JP); Tomohisa Konno, Tokyo (JP); Takafumi Fueki, Tokyo (JP); Hajime Kondou, Tokyo (JP)

(73) Assignee: JSR Corporation, Tokyo (JP)

( * ) Notice: Subject to any disclaimer, the term of this patent is extended or adjusted under 35 U.S.C. 154(b) by 22 days.

(21) Appl. No.: 10/069,665

(22) PCT Filed: Jun. 29, 2001

(86) PCT No.: PCT/JP01/05660

§ 371 (c)(1), (2), (4) Date: Feb. 28, 2002

(87) PCT Pub. No.: WO02/00779

PCT Pub. Date: Jan. 3, 2002

(65) Prior Publication Data

US 2003/0125467 A1 Jul. 3, 2003

(30) Foreign Application Priority Data

Jun. 29, 2000 (JP) .......................... 2000-197065

(51) Int. Cl.[7] .......................... C08F 8/00; C08L 23/00; C08L 23/04; C08L 25/02
(52) U.S. Cl. .................. 525/191; 525/240; 525/241
(58) Field of Search .................. 525/191, 240, 525/241

(56) References Cited

U.S. PATENT DOCUMENTS

| | | |
|---|---|---|
| 6,191,234 B1 | 2/2001 | Tadaki et al. |
| 6,344,518 B1 | 2/2002 | Kobayashi et al. |
| 6,362,272 B1 | 3/2002 | Tadaki et al. |
| 6,395,833 B1 * | 5/2002 | Tasaka et al. ............... 525/192 |
| 6,445,336 B2 * | 9/2002 | Soshi et al. .................. 342/70 |

FOREIGN PATENT DOCUMENTS

| | | |
|---|---|---|
| GB | 1 078 400 | 8/1967 |
| JP | 02-300245 | 12/1990 |
| JP | 03-177444 | 8/1991 |
| JP | 09-208623 | 8/1997 |
| JP | 09-208633 | 8/1997 |
| JP | 10-204217 | 8/1998 |
| JP | 10-204225 | 8/1998 |
| JP | 2001-031798 | 2/2001 |
| WO | 96/23027 | 8/1996 |

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

It is an object of the present invention to provide a rubber composition which can give a vulcanized rubber with low rolling resistance and excellent wet skid resistance and wear resistance, which is particularly useful for automobile tire treads and the like.

The rubber composition of the invention comprises (1) a crosslinked rubber particle containing, as repeating units, 40 to 79.99% by weight of a monomer unit formed by a conjugated diene such as 1,3-butadiene, 20 to 50% by weight of a monomer unit formed by an aromatic vinyl monomer such as styrene and 0.01 to 10% by weight of a monomer unit formed by a monomer having at least two polymerizable unsaturated groups such as divinylbenzene, and (2) a conjugated diene/aromatic vinyl copolymeric rubber whose vinyl content of the conjugated diene monomer unit is 10 to 30% and whose 1,4-trans bond content is more than 55%, such as styrene-butadiene copolymeric rubber. The crosslinked rubber particle may also contain a repeating unit composed of a monomer having one polymerizable unsaturated group and carboxylic group, hydroxyl group and/or epoxy group.

33 Claims, No Drawings

RUBBER COMPOSITION

FIELD OF THE ART

The present invention relates to a rubber composition with a specific composition. Vulcanized rubber made of the rubber composition of the present invention shows low rolling resistance and excellent wet skid resistance, as well as satisfactory wear resistance, tensile strength and the like, and is particularly useful for tire treads.

BACKGROUND ART

Recent requirements for lower fuel consumption by automobiles have created a need for a composition such as conjugated diene-based rubber compositions whose rubbers have low rolling resistance, excellent wear resistance and fracture properties, and high wet skid resistance as a representative indicator of good driving stability.

The tire rolling resistance can be reduced by lowering hysteresis loss of the vulcanized rubber. This hysteresis loss can be evaluated based on various properties. For example, a composition having high impact resilience at 50 to 80° C., low tan δ at 50 to 80° C. or low Goodrich heat release, is preferable. A raw rubber having low hysteresis loss include natural rubber, isoprene rubber, butadiene rubber and the like, but these are also associated with the problem of low wet skid resistance.

On the other hand, there have been proposed a method of using an inorganic filler such as silica and the like as a reinforcing agent, or a method of combining an inorganic filler and carbon black in recent years. Tire treads employing an inorganic filler or both an inorganic filler and carbon black show low rolling resistance and excellent driving stability represented by wet skid resistance. However, they exhibit a problem of poor wear resistance, tensile strength and the like for the vulcanized rubber. The cause is believed to be the fact that the affinity of the inorganic filler for the conjugated diene-based rubber is lower than that of the carbon black, such that a sufficient reinforcing effect cannot be achieved.

In order to increase the affinity between the inorganic filler and the conjugated diene-based rubber, it has been attempted to use a conjugated diene-based rubber introduced a functional group with affinity for an inorganic filler therein. For example, there have been proposed a conjugated diene-based rubber introduced a hydroxyl group therein (WO96/23027), a conjugated diene-based rubber introduced an alkoxysilyl group therein (JP-A-9-208623) and a conjugated diene-based rubber introduced an alkoxysilyl group and an amino and/or a hydroxyl group therein (JP-A-9-208633). However, most conjugated diene-based rubbers introduced such functional group exhibit strong interaction with the inorganic filler when the inorganic filler is combined therewith, and this creates such problems as impaired dispersion of the inorganic filler, greater heat release during processing, poor proccessability and the like.

It is an object of the invention to overcome the problems referred to above by providing a rubber composition which can give a vulcanized rubber having low rolling resistance and excellent wet skid resistance, as well as satisfactory wear resistance and tensile strength, which is useful for automobile tire treads and the like.

DISCLOSURE OF THE INVENTION

A rubber composition for formation of a tire tread and the like usually contains a reinforcing agent for the purpose of improving tensile strength and wear resistance, but an inorganic filler such as silica is not easily dispersed uniformly because of their tendency to aggregate. Using a rubber composition in which a reinforcing agent is not uniformly dispersed leads to a result that a desired effect of including the reinforcing agent cannot be achieved, as well as that the proccessability is also notably impaired. For this reason, it has generally been attempted to improve the dispersion properties by formulating a silane coupling agent when using a silica as an inorganic filler. However, it was found that inclusion of fine particles composed of crosslinked rubber having a specific composition in a rubber composition can adequately improve tensile strength even with a small amount of a silane coupling agent or even without including a silane coupling agent, and that the resulting rubber composition has excellent proccessability.

The present invention is based on the findings described above and can be described as follows.

A rubber composition of the first aspect of the invention is characterized in that it comprises [1A] a crosslinked rubber particle containing, as repeating units, (a1) 40 to 79.99% by weight of a conjugated diene monomer unit, (a2) 20 to 50% by weight of an aromatic vinyl monomer unit and (a3) 0.01 to 10% by weight of a monomer unit formed by a monomer having at least two polymerizable unsaturated groups with respect to 100% by weight of the total of (a1), (a2) and (a3), and [2A] a conjugated diene/aromatic vinyl copolymeric rubber wherein vinyl bond content of the conjugated diene unit is 10 to 30% by weight and 1,4-trans bond content is exceeding 55% by weight.

A rubber composition of the second aspect of the invention is characterized in that it comprises [1B] a crosslinked rubber particle containing, as repeating units, (b1) 40 to 99.89% by weight of a conjugated diene monomer unit, (b2) 0 to 50% by weight of an aromatic vinyl monomer unit, (b3) 0.01 to 10% by weight of a monomer unit formed by a monomer having at least two polymerizable unsaturated groups and (b4) 0.1 to 30% by weight of a monomer unit formed by a monomer having one polymerizable unsaturated group and at least one functional group selected from the group consisting of carboxylic group ($CO_2H$ and/or $CO_2^-$), hydroxyl group and epoxy group with respect to 100% by weight of the total of (b1), (b2), (b3) and (b4), and [2B] a conjugated diene/aromatic vinyl copolymeric rubber wherein vinyl bond content of the conjugated diene unit is 10 to 30% by weight and 1,4-trans bond content is exceeding 55% by weight.

The crosslinked rubber particle according to the first aspect of the invention is prepared by polymerizing a conjugated diene monomer forming a conjugated diene monomer unit (a1), an aromatic vinyl monomer forming an aromatic vinyl monomer unit (a2), and a monomer having at least two polymerizable unsaturated groups.

And the crosslinked rubber particle according to the second aspect of the invention is prepared by polymerizing a conjugated diene monomer forming a conjugated diene monomer unit (b1), an aromatic vinyl monomer forming an aromatic vinyl monomer unit (b2) as necessary, a monomer having at least two polymerizable unsaturated groups, and a monomer having one polymerizable unsaturated group and at least one functional group selected from the group consisting of carboxylic group ($CO_2H$ and/or $CO_2^-$), hydroxyl group and epoxy group.

In both first and second aspects of the invention, another polymerizable unsaturated monomer described hereunder may also be used.

As the conjugated diene monomer forming the conjugated diene monomer unit (a1) and (b1) described above, there may be used 1,3-butadiene, isoprene, 2,3-dimethyl-1,3-butadiene, chloroprene and the like. Any of these monomers may be used alone or in combination of two or more, respectively.

The content of the conjugated diene monomer unit (a1) according to the first aspect of the invention is 40 to 79.99% by weight and preferably 55 to 79.99% by weight. The content of the conjugated diene monomer unit (b1) according to the second aspect of the invention is 40 to 99.89% by weight and preferably 55 to 99.89% by weight. If the content of the conjugated diene monomer unit described above is under the respective lower limits, proccessability is not improved and tensile strength of the vulcanized rubber is lowered.

As the aromatic vinyl monomer forming the aromatic vinyl monomer unit (a2) and (b2) described above there may be used styrene, 2-methylstyrene, 3-methylstyrene, 4-methylstyrene, α-methylstyrene, 2,4-dimethylstyrene, 2,4-diisopropylstyrene, 4-tert-butylstyrene, tert-butoxystyrenes and the like. These monomers may be used alone or in combination of two or more, respectively.

The content of the aromatic vinyl monomer unit (a2) according to the first aspect of the invention is 20 to 50% by weight and preferably 20 to 45% by weight. The content of the aromatic vinyl monomer unit (b2) according to the second aspect of the invention is 0 to 50% by weight and preferably 0 to 45% by weight. If the content of the aromatic vinyl monomer unit described above is exceeding 50% by weight, impact resilience of the vulcanized rubber is reduced, and the value of tan δ of the vulcanized rubber at 50° C. tends to be larger.

As the monomer having at least two polymerizable unsaturated groups forming the monomer unit (a3) and (b3) described above there may be used ethylene glycol di(meth) acrylate, propylene glycol di(meth)acrylate, 1,4-butanediol di(meth)acrylate, 1,6-hexanediol di(meth)acrylate, trimethylolpropane di(meth)acrylate, trimethylolpropane tri (meth)acrylate, pentaerythritol tri(meth)acrylate, pentaerythritol tetra(meth)acrylate, divinylbenzene, diisopropylbenzene, trivinylbenzene and the like. Among these, divinylbenzene and the like are preferred. Any of these monomers may be used alone or in combination of two or more, respectively.

The content of the monomer unit (a3) and (b3) having at least two polymerizable unsaturated groups described above according to both first and second aspects of the invention is 0.01 to 10% by weight and preferably 0.1 to 10% by weight, respectively. If the content of (a3) or (b3) is less than 0.01% by weight, proccessability of the rubber composition of the invention is reduced. On the other hand, if the content is greater than 10% by weight, not only proccessability of the rubber composition is impaired, but also tensile strength of the vulcanized rubber is greatly reduced, to an undesirable level.

As the monomer having one polymerizable unsaturated group and a carboxylic group ($CO_2H$ and/or $CO_2^-$) for the monomer unit (b4) according to the second aspect of the invention, there may be used ① unsaturated carboxylic acid such as (meth)acrylic acid, maleic acid, fumaric acid, itaconic acid, tetraconic acid, cinnamic acid and the like, and ② free carboxyl group-containing ester such as monoester of non-polymerizable polyvalent carboxylic acid such as phthalic acid, succinic acid and adipic acid with hydroxyl group-containing unsaturated compound such as (meth)allyl alcohol and 2-hydroxyethyl (meth) acrylate, and their salts and the like.

Among these, unsaturated carboxylic acids (especially (meth)acrylic acid and the like) are preferred. Any of these monomers having carboxylic group listed above may be used alone or in combination of two or more.

As the monomer having one polymerizable unsaturated group and a hydroxyl group according to the second aspect of the invention, there may be used ① hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate and the like, ② mono (meth)acrylates of a polyalkylene glycol (the number of alkylene glycol units is for example 2 to 23) such as polyethylene glycol, polypropylene glycol and the like, ③ hydroxyl group-containing unsaturated amides such as N-hydroxymethyl (meth)acrylamide, N-(2-hydroxyethyl) (meth)acrylamide, N,N-bis(2-hydroxyethyl) (meth)acrylamide and the like, ④ hydroxyl group-containing aromatic vinyl compounds such as o-hydroxystyrene, m-hydroxystyrene, p-hydroxystyrene, o-hydroxy-α-methylstyrene, m-hydroxy-α-methylstyrene, p-hydroxy-α-methylstyrene, p-vinylbenzyl alcohol and the like, and ⑤ hydroxyl group-containing compounds such as (meth) allyl alcohol and the like.

Among these, hydroxyalkyl (meth)acrylates and hydroxyl group-containing aromatic vinyl compounds are preferred. Any of these monomers may be employed alone or in combination of two or more.

As the monomer having one polymerizable unsaturated group and an epoxy group according to the second aspect of the invention, there may be used epoxy group-containing compounds such as (meth)allylglycidylether, glycidyl (meth)acrylate, 3,4-oxycyclohexyl (meth)acrylate and the like. Any of these monomers may be employed alone or in combination of two or more.

The monomer forming the monomer unit (b4) described above is preferably a monomer having a hydroxyl group and/or an epoxy group in view of impact resilience and wear resistance of a vulcanized rubber as well as proccessability of the rubber composition, especially a reduced shrinkage of an unvulcanized rubber composition.

The monomer forming the monomer unit (b4) may be selected for use as desired. And proccessability of the rubber composition of the invention and mechanical strength of the vulcanized rubber and the like can be even further improved by suitable combination of a crosslinked rubber particle and a functional group composed in the conjugated diene/ aromatic vinyl copolymeric rubber described hereunder. A combination of two or more monomers having a carboxylic group, a hydroxyl group or an epoxy group may also be used. For example, a combination of a monomer having a carboxylic group and a monomer having a hydroxyl group may be used as the monomer forming the monomer unit (b4).

The content of the monomer unit (b4) described above is 0.1 to 30% by weight and especially 0.3 to 15% by weight preferred. If the content of the monomer unit (b4) is less than 0.1% by weight, the affinity between the crosslinked rubber particle and an inorganic filler is insufficient, and proccessability of the rubber composition may be reduced. On the other hand, if the content is greater than 30% by weight, the crosslinked rubber particle and an inorganic filler interact strongly with each other, and proccessability may be reduced.

The crosslinked rubber particle [1A] described above in the first aspect of the invention contains the monomer unit (a1) of 40 to 79.99% by weight (preferably 50 to 79.99% by weight), the monomer unit (a2) of 20 to 50% by weight (preferably 20 to 45% by weight), and the monomer unit (a3) of 0.01 to 10% by weight (preferably 0.1 to 10% by weight), respectively.

The crosslinked rubber particle [1B] described above in the second aspect of the invention contains the monomer unit (b1) of 40 to 99.89% by weight (preferably 50 to 99.89% by weight), the monomer unit (b2) of 0 to 50% by weight (preferably 0 to 45% by weight), the monomer unit (b3) of 0.01 to 10% by weight (preferably 0.1 to 10% by weight) and the monomer unit (b4) of 0.1 to 30% by weight (preferably 0.3 to 15% by weight), respectively. A combination of preferable contents of the monomer unit described above is not particularly limited.

In the second aspect of the invention, the content of the aromatic vinyl monomer unit (b2) described above is not particularly limited so long as it is within the range from 0 to 50% by weight. The content of the aromatic vinyl monomer unit (b2) described above may for example be 20 to 50% by weight (the content of the conjugated diene monomer unit is 40 to 79.89% by weight in this case), or 20 to 45% by weight (the content of the conjugated diene monomer unit is 40 to 79.89% by weight in this case), or less than 20% by weight, or 10% by weight or less, or also 0% by weight (thus is not contained). In any of these cases the monomer (b4) described above is preferably a monomer unit formed by a monomer having one polymerizable unsaturated group and at least one functional group selected from the group consisting of a hydroxyl group and an epoxy group. Especially, the content of the aromatic vinyl monomer unit (b2) can be 20 to 50% by weight, the content of the conjugated diene monomer unit (b1) can be 40 to 79.89% by weight, and the monomer unit (b4) can be a monomer unit formed by a monomer having one polymerizable unsaturated group and at least one functional group selected from the group consisting of a hydroxyl group and an epoxy group. And the content of the aromatic vinyl monomer unit (b2) can be 0% by weight, the content of the conjugated diene monomer unit (b1) can be 40 to 99.89% by weight, and the monomer unit (b4) can be a monomer unit formed by a monomer having one polymerizable unsaturated group and at least one functional group selected from the group consisting of a hydroxyl group and an epoxy group. A crosslinked rubber particle having such a composition may be a crosslinked polybutadiene modified with a functional group.

The monomer unit constituting the crosslinked rubber particle [1A] and [1B] includes the other monomer unit. The other polymerizable unsaturated monomer forming the other monomer unit is preferably a compound having one copolymerizable unsaturated group, and while there are no particular restrictions on its type, those having polar groups are preferred.

As such monomer described above there may be used (meth)acrylonitrile, vinylidene cyanide, vinyl chloride, vinylidene chloride, (meth)acrylamide, maleimide, methyl (meth)acrylate, ethyl (meth)acrylate, n-propyl (meth) acrylate, iso-propyl (meth)acrylate, n-butyl (meth)acrylate, iso-butyl (meth)acrylate, sec-butyl (meth)acrylate, tert-butyl (meth)acrylate, n-amyl (meth)acrylate, n-hexyl (meth) acrylate, 2-ethylhexyl (meth)acrylate, cyclohexyl (meth) acrylate and the like. Any of these monomers may be used alone or in combination of two or more, respectively.

In both first and second aspects of the invention, the amount of the above-mentioned monomer to be used may be 0.1 to 5% by weight and especially 0.5 to 3% by weight with respect to 100% by weight of the total of the monomers forming the crosslinked rubber particle.

The particle comprising the crosslinked rubber described above is a particulate rubber with a preferable toluene insoluble content of 80% by weight or more. The toluene insoluble content is determined by immersing 1 g of the particle comprising the crosslinked rubber in 100 ml of toluene for 24 hours at room temperature and then measuring the weight of a solid content in the filtrate obtained by filtering with a 100 mesh-sized wire mesh. And the crosslinked rubber particle described above is a particulate rubber with a particle size of preferably 500 nm or less as measured using a laser particle analysis system (Model No. "LPA-3100" by Otsuka Electronics Co., Ltd.).

The crosslinked rubber particle may be produced by emulsion polymerization, suspension polymerization and the like using a radical polymerization initiator. It is preferably produced by emulsion polymerization from the standpoint of the particle size and the particle size uniformity.

The radical polymerization initiator for an emulsion polymerization includes an organic peroxide such as benzoyl peroxide, lauryl peroxide, tert-butyl hydroperoxide, cumene hydroperoxide, p-methane hydroperoxide, di-tert-butyl peroxide, dicumyl peroxide and the like. In addition, a diazo compound such as azobisisobutyronitrile, an inorganic peroxide such as potassium persulfate, and a redox catalyst such as a combination of any of these peroxides with ferrous sulfate and the like may also be used. Any of these radical polymerization initiators may be used alone or in combination of two or more.

A chain transfer agent such as mercaptans including tert-dodecylmercaptan, n-dodecylmercaptan and the like, carbon tetrachloride, thioglycols, diterpene, terpinolene, γ-terpinene and the like may also be used in combination.

An emulsifier employed in an emulsion polymerization may, for example, be an anionic surfactant, a nonionic surfactant, a cationic surfactant as well as an amphoteric surfactant and the like. A fluorine-based surfactant may also be employed. Any of these emulsifiers may be used alone or in combination of two or more.

A suspension stabilizer employed in a suspension polymerization may, for example, be polyvinyl alcohol, sodium polyacrylate, hydroxyethyl cellulose and the like. Any of these suspension stabilizers may be used alone or in combination of two or more.

In an emulsion or a suspension polymerization, monomers, a radical polymerization initiator and the like may be charged all to the reaction vessel at once, or they may be added continuously or intermittently over the period of the reaction. The polymerization may be performed in an oxygen-free reaction vessel at 0 to 80° C. with changing temperature, stirring condition or the like as desired during the reaction. The polymerization may be of a continuous system or a batch system.

The conjugated diene/aromatic vinyl copolymeric rubber in both first and second aspects of the invention is not particularly restricted so long as it is a rubber comprising a monomer forming a conjugated diene monomer unit and a monomer forming an aromatic vinyl monomer unit. As the monomer forming the conjugated diene monomer unit, the above-mentioned monomer forming the monomer unit (a1)

may be used, and as the monomer forming the aromatic vinyl monomer unit, the above-mentioned monomer forming the monomer unit (a2) may be used. The content of the aromatic vinyl monomer unit in the conjugated diene/aromatic vinyl copolymeric rubber is preferably 20 to 50% by weight and especially 22 to 48% by weight.

Further, a polymerizable unsaturated monomer which is copolymerizable with these monomers may be used as option. The polymerizable unsaturated monomer may be used (meth)acrylonitrile, vinylidene cyanide, vinyl chloride, vinylidene chloride, (meth)acrylamide, maleimide, methyl (meth)acrylate, ethyl (meth)acrylate, n-propyl (meth)acrylate, iso-propyl (meth)acrylate, n-butyl (meth)acrylate, iso-butyl (meth)acrylate, sec-butyl (meth)acrylate, tert-butyl (meth)acrylate, n-amyl (meth)acrylate, n-hexyl (meth)acrylate, 2-ethylhexyl (meth)acrylate, cyclohexyl (meth)acrylate and the like. Any of these monomers may be used alone or in combination of two or more.

The conjugated diene/aromatic vinyl copolymeric rubber may be a conjugated diene/aromatic vinyl copolymeric rubber wherein at least one functional group selected from the group consisting of carboxylic group, amino group, hydroxyl group, epoxy group and alkoxysilyl group is introduced into its molecule. This can increase the affinity between an inorganic filler and the conjugated diene/aromatic vinyl copolymeric rubber. The functional group may be the same type as that introduced into the crosslinked rubber particle, or they may be a different from each other. These functional groups may be introduced by using a polymerizable unsaturated monomer which has a functional group and is copolymerizable with the monomer described above.

In the case a conjugated diene/aromatic vinyl copolymeric rubber which a functional group is introduced by using the functional group-containing monomer described above, is employed, the content of the monomer unit containing a functional group is preferably 0.1 to 30% by weight with respect to the total of the rubber component. If the content of any of these monomer units is less than 0.1% by weight, it is difficult in obtaining an effect of introduction of a functional group. And the content exceeding 30% by weight results in a strong interaction between a conjugated diene/aromatic vinyl copolymeric rubber and a silica, which may lead to reduction in proccessability.

In the case the crosslinked rubber particle is the one whose content of the aromatic vinyl monomer unit (b2) described above is zero, and the monomer unit (b4) is a monomer unit formed by a monomer having one polymerizable unsaturated group and at least one functional group selected from the group consisting of a hydroxyl group and an epoxy group, a functional group introduced into the conjugated diene/aromatic vinyl copolymeric rubber described above is at least one selected from the group consisting of a carboxylic group ($CO_2H$ and/or $CO_2^-$), an amino group, a hydroxyl group, an epoxy group and an alkoxysilyl group, a hydroxyl group and/or an epoxy group are preferred.

As a monomer having one polymerizable unsaturated group and at least one functional group selected from the group consisting of a carboxylic group ($CO_2H$ and/or $CO_2^-$), an amino group, a hydroxyl group, an epoxy group and an alkoxysilyl group, a monomer having the same type of carboxylic group, hydroxyl group or epoxy group may be used as for the production as that in the crosslinked rubber particle described above, and a monomer having an amino group or an alkoxysilyl group may be used.

As a monomer forming the monomer unit having one polymerizable unsaturated group and amino group, tertiary amino group-containing monomer is preferable and there may be mentioned ① Dialkylaminoalkyl (meth)acrylates such as dimethylaminomethyl (meth)acrylate. diethylaminomethyl (meth)acrylate, 2-dimethylaminoethyl (meth)acrylate, 2-diethylaminoethyl (meth)acrylate, 2-dimethylaminoethyl (meth)acrylate, 2-diethylaminoethyl (meth)acrylate, 2-(di-n-propylamino) ethyl (meth)acrylate, 2-dimethylaminopropyl (meth)acrylate, 2-diethylaminopropyl (meth)acrylate, 2-(di-n-propylamino) propyl (meth)acrylate, 3-dimethylaminopropyl (meth)acrylate, 3-diethylaminopropyl (meth)acrylate, 3-(di-n-propylamino) propyl (meth)acrylate and the like, ② N-dialkylaminoalkyl group-containing unsaturated amides such as N-dimethylaminomethyl (meth)acrylamide, N-diethylaminomethyl (meth)acrylamide, N-(2-dimethylaminoethyl) (meth)acrylamide, N-(2-diethylaminoethyl) (meth)acrylamide, N-(2-dimethylaminopropyl) (meth)acrylamide, N-(2-diethylaminopropyl) (meth)acrylamide, N-(3-dimethylaminopropyl) (meth)acrylamide, N-(3-diethylaminopropyl) (meth)acrylamide and the like, ③ Tertiary amino group-containing aromatic vinyl compounds, such as N,N-dimethyl-p-aminostyrene, N,N-diethyl-p-aminostyrene, dimethyl(p-vinylbenzyl)amine, di-ethyl(p-vinylbenzyl)amine, dimethyl(p-vinylphenethyl)amine, diethyl(p-vinylphenethyl), amine, dimethyl (p-vinylbenzyloxymethyl)amine, dimethyl-[2-(p-vinylbenzyloxy) ethyl]amine diethyl(p-vinylbenzyloxymethyl)amine, diethyl[2-(p-vinylbenzyloxy)ethyl]amine, dimethyl (p-vinylphenethyloxymethyl) amine, dimethyl [2-(p-vinylphenethyloxy) ethyl]amine, diethyl(p-vinylphenethyloxymethyl)amine, diethyl[2-(p-vinylphenethyloxy)ethyl]amine, 2-vinylpyridine, 3-vinylpyridine, 4-vinylpyridine and the like.

Among these listed above, a dialkylaminoalkyl (meth)acrylates and a tertiary amino group-containing aromatic vinyl compounds are preferred.

As a monomer forming the monomer unit having one polymerizable unsaturated group and alkoxysilyl group there may be mentioned (meth)acryloxymethyl trimethoxysilane, (meth)acryloxymethyl methyldimethoxysilane (meth)acryloxymethyl dimethylmethoxysilane, (meth)acryloxymethyl triethoxysilane, (meth)acryloxymethyl methyldiethoxysilane, (meth)acryloxymethyl dimethylethoxysilane, (meth)acryloxymethyl tripropylsilane, (meth)acryloxymethyl methyldipropoxysilane, (meth)acryloxymethyl dimethylpropoxysilane, γ-(meth)acryloxypropyl trimethoxysilane, γ-(meth)acryloxypropyl methyldimethoxysilane. γ-(meth)acryloxypropyl dimethylmethoxysilane, γ-(meth)acryloxypropyl triethoxysilane, γ-(meth)acryloxypropyl methyldiethoxysilane, γ-(meth)acryloxypropyl dimethylethoxysilane, γ-(meth)acryloxypropyl tripropylsilane, γ-(meth)acryloxypropyl methyldipropoxysilane, γ-(meth)acryloxypropyl dimethylpropoxysilane, γ-(meth)acryloxypropyl methyldiphenoxysilane, γ-(meth)acryloxypropyl dimethyldiphenoxysilane, γ-(meth)acryloxypropyl methyldibenzyloxysilane, γ-(meth)acryloxypropyl dimethylphenoxysilane and the like.

Any of monomers having these functional groups may be used alone or in combination of two or more. And monomers having different functional groups may be used in combination.

The conjugated diene/aromatic vinyl copolymeric rubber according to both first and second aspects of the invention may be a styrene-butadiene copolymeric rubber and the like. The vinyl bond content in the conjugated diene unit of the conjugated diene/aromatic vinyl copolymeric rubber is preferably 10 to 30% by weight, more preferably 12 to 25% by weight and 1,4-trans bond content is preferably exceeding 55% by weight, more preferably exceeding 60% by weight. The upper limit is usually about 85% by weight. If the vinyl bond content increases, impact resilience and wear resistance of the vulcanized rubber may be reduced. On the other hand, if the 1,4-trans bond content is small, tensile strength is reduced. By adjusting a microstructure within the range specified above, a vulcanized rubber which is excellent in these characteristics can be obtained.

In both first and second aspects of the invention, the content of the conjugated diene unit constituting the conjugated diene/aromatic vinyl copolymeric rubber is preferably 50 to 80% by weight, particularly 55 to 80% by weight. And the content of the aromatic vinyl monomer unit is preferably 20 to 50% by weight, particularly 20 to 45% by weight.

In the case the conjugated diene/aromatic vinyl copolymeric rubber is the one having functional groups introduced therein, the content of the conjugated diene unit constituting the conjugated diene/aromatic vinyl copolymeric rubber is preferably 40 to 79.9% by weight, particularly 50 to 77.9% by weight, and the content of the aromatic vinyl monomer unit is preferably 20 to 50% by weight, particularly 20 to 45% by weight.

If the content of the aromatic vinyl monomer unit is small, wet skid resistance and wear resistance of the vulcanized rubber may be reduced. On the other hand, if the content is large, impact resilience of the vulcanized rubber is reduced and the value of tan δ of the vulcanized rubber at 50° C. tends to be larger. By adjusting the content of the aromatic vinyl monomer unit within the range specified above, a rubber composition which is excellent in these physical characteristics can be obtained.

The conjugated diene/aromatic vinyl copolymeric rubber is a rubber with a preferable toluene insoluble content of 30% by weight or less determined by immersing 1 g of the copolymeric rubber in 100 ml of toluene for 24 hours at room temperature and then measuring the weight of a solid portion in the filtrate obtained by filtering with a 100 mesh-sized wire mesh, and with a preferable weight-average molecular weight of 100,000 to 2,000,000 as measured by GPC (gel permeation chromatography) in terms of polystyrene.

In both first and second aspects of the invention, the conjugated diene/aromatic vinyl copolymeric rubber described above may be produced by emulsion polymerization or suspension polymerization. The polymerization method is not particularly limited and emulsion polymerization is preferred.

The rubber compositions in both first and second aspects of the invention can be ones that the other rubber component is added. A diene-based rubber is preferably used as the rubber component and may be used natural rubber, isoprene rubber, styrene-butadiene copolymeric rubber, butadiene rubber, butyl rubber, ethylene-propylene-diene ternary copolymeric rubber and the like. Among these rubbers, natural rubber, styrene-butadiene copolymeric rubber and butadiene rubber are preferable in the view of the physical characterization of an unvulcanized rubber composition or a vulcanized rubber composition obtained and the ease of carrying out of acquisition of a raw rubber.

A filler is usually incorporated into the rubber composition of the present invention. The filler is not particularly restricted, there may be used a silica, an inorganic filler consisting of an inorganic compound as represented by the formula (I), carbon black, carbon black-silica dual phase filler and the like.

$$mM_1 \cdot xSiO_y \cdot zH_2O \tag{I}$$

[In the formula (I), $M_1$ is at least one selected from the group consisting of Al, Mg, Ti, and Ca; any oxide of any one of the metals; or any hydroxide of any one of the metals; and m, x, y, and z are integers from 1 to 5, 0 to 10, 2 to 5, and 0 to 10, respectively.]

A rubber composition incorporated a reinforcing inorganic filler shows a remarkable effect of the invention.

Examples of the inorganic compounds of formula (I) include alumina monohydrate ($Al_2O_3 \cdot H_2O$), aluminum hydroxide [$Al(OH)_3$] such as gibbsite and bayerite, magnesium hydroxide [$Mg(OH)_2$], magnesium oxide (MgO), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide [$Ca(OH)_2$], magnesium aluminum oxide ($MgO \cdot Al_2O_3$), clay ($Al2O_3 \cdot 2SiO_2$), kaolin ($Al_2O_3 \cdot 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminum silicate (for example. $Al_2SiO_5$, $Al_4 \cdot 3SiO_4 \cdot 5H_2O$), magnesium silicate (for example, $Mg_2SiO_4$, $MgSiO_3$), calcium silicate ($Ca_2 \cdot SiO_4$), calcium aluminum silicate (for example, $Al_2O_3 \cdot CaO \cdot 2SiO_2$), and calcium magnesium silicate ($CaMgSiO_4$), crystalline aluminum silicate containing hydrogen which corrects a charge such as a variety of zeolite, alkali metal, or alkali earth metal, and the like. The "M" is preferably aluminum. Particle sizes of these inorganic compounds are preferably 10 μm or less, more preferably 3 μm or less. Using an inorganic compound whose particle size is 10 μm or less leads to good fracture properties and excellent wear resistance of the vulcanized rubber.

Among the reinforcing filler described above, silica, aluminum hydroxide, carbon black and carbon black-silica dual phase filler are preferred.

The silica used may be a silica commonly used as a white reinforcing additive for synthetic rubbers. While the type of a silica is not particularly limited, a wet process type white carbon (a precipitated silica described in JP-A-62-62838), a dry process type white carbon, a colloidal silica and the like can be employed. Among those listed above, a wet process type white carbon whose main component is silicic hydrate is preferred particularly. Any of these silica-based compounds may be employed alone or in combination of two or more. While the specific surface area of the silica is not particularly limited, a nitrogen absorption specific surface area (area determined by BET method in accordance with ASTM D3037-81) is preferably 50 to 400 m²/g, more preferably 50 to 220 m²/g, most preferably 70 to 220 m²/g, for the purpose of achieving a sufficient improvement in reinforcing performance, wear resistance, exothermic behavior and the like.

While the type of a carbon black or the like is not particularly limited, those which may be employed are a furnace black, an acetylene black, a thermal black, a channel black, a graphite, and the like. Among those listed above, a furnace black such as SAF, ISAF, ISAF-HS, ISAF-LS, IISAF-HS, HAF, HAF-HS, HAF-LS, FEF, and the like is preferred. Any of these carbon blacks may be employed alone or in combination of two or more.

While the nitrogen absorption specific surface area of a carbon black determined similarly to a silica is not particularly limited, it is preferably 5 to 200 m²/g, more preferably 50 to 150 m²/g, most preferably 80 to 130 m²/g, for the purpose of achieving a sufficient improvement in tensile strength and wear resistance of a vulcanized rubber and the like. While the DBP absorption level of the carbon black is not particularly limited as well, it is 5 to 300 ml/100 g, preferably 50 to 200 ml/100 g, more preferably 80 to 160 ml/100 g, for the purpose of a sufficient improvement in tensile strength and wear resistance and the like. A further improvement in wear resistance can be achieved by using as a carbon black a high structure carbon black described in JP-A-5-230290, whose cetyltrimethylammonium bromide absorption specific surface area is 110 to 170 $m^2$/g and whose DBP (24M4DBP) oil absorption level after compressing under 165 MPa and four times repetitively is 110 to 130 ml/100 g.

The content of the reinforcing filler is preferably 20 to 200 parts, especially 30 to 180 parts, more especially 30 to 150 parts, with respect to 100 parts of the total of the crosslinked rubber particle and the conjugated diene-aromatic vinyl copolymeric rubber. Little content of the reinforcing filler leads to an insufficient reinforcing effect, resulting in a problematically reduced tensile strength and the like. On the other hand, much content leads to a reduced workability. By adjusting the content in the range described above, a rubber composition whose workability in unvulcanized state is excellent and whose physical characterization in vulcanization is excellent, can be obtained.

The rubber composition of the invention may also contain the other various components mentioned below in addition to the filler.

An extending oil such as aromatic-based process oils, naphthene-based process oils, paraffin-based process oils and other petroleum-based blended oils may also be incorporated. Preferred as the extending oil are aromatic-based and naphthene-based process oils. The amount of the extending oil to be incorporated is preferably 100 parts or less, more preferably 80 parts or less, most preferably 70 parts or less with respect to 100 parts of solid content of the rubber component. If the content is exceeding 100 parts, viscosity of the rubber composition may be reduced.

As a vulcanization accelerator there may be used aldehyde ammonia-based, guanidine-based, thiourea-based, thiazole-based and dithiocarbaminic acid-based ones, and these are preferably used at 0.5 to 15 parts and especially 1 to 10 parts with respect to 100 parts of the total of the crosslinked rubber particle, the conjugated diene/aromatic vinyl copolymeric rubber and the other rubber component. Also, sulfur is representative as a vulcanizing agent, but sulfur-containing compound, peroxide and the like may also be used. The vulcanizing agent such as sulfur, sulfur-containing compound, peroxide and the like is usually used as the sulfur content, at 0.5 to 10 parts and preferably 1 to 6 parts with respect to 100 parts as the total of the crosslinked rubber particle, the conjugated diene/aromatic vinyl copolymeric rubber and the other rubber component.

In addition, appropriate amounts of a silane coupling agent, a vulcanizing aid, an anti-aging agent, a working adjuvant, a softener, an inorganic filler such as zinc oxide, calcium carbonate and magnesium carbonate and the like may also be incorporated.

The rubber composition of the present invention and rubber products employing it may be manufactured in the following fashion.

First, a crosslinked rubber particle, a conjugated diene/aromatic vinyl copolymeric rubber, the other rubber component, an inorganic filler, a reinforcing filler, a softener and other additives are kneaded at a temperature in the range of 70 to 180° C. using a kneading machine such as a Banbury mixer. The kneaded product is then cooled, the vulcanizing agent such as sulfur and vulcanizing accelerators are added using a Banbury mixer or mixing roll, and the mixture is molded into the desired shape. This is followed by vulcanization at a temperature in the range of 140 to 180° C. to obtain the desired vulcanized rubber as the rubber product.

A vulcanized rubber obtained using the rubber composition according to the present invention exhibits excellent wet skid resistance, tensile strength, impact resilience and the like. It also has satisfactory proccessability, and therefore the rubber composition is useful as a rubber composition for tires, and is particularly suitable for tire treads.

A pneumatic tire obtained using the rubber composition of the present invention as its tread is excellent in gas mileage, steering stability, fracture properties and wear resistance. And the rubber composition gives a high producibility due to a satisfactory proccessability.

A pneumatic tire according to the invention is produced by a standard method. Thus, a rubber composition supplemented if necessary with various agents as described above is extruded as being unvulcanized in to a tread part, affixed onto a tire mold by a standard method to form a raw tire, which is then pressurized with heating in a vulcanizing machine, whereby obtaining a pneumatic tire according to the invention.

Not only air but also inert gas such as nitrogen may be used as a gas in the pneumatic tire according to the invention.

PREFERRED EMBODIMENTS OF THE INVENTION

The present invention will now be explained in further detail by examples, which should not be construed as limiting the scope of the present invention.

[1] Production of a Crosslinked Rubber Particle

A polymerization vessel was charged with 200 parts of water, 4.5 parts of rosin acid soap and monomers with the compositions listed in Table 1 (the units in Table 1 are "parts"). The temperature of the polymerization vessel was then set to 5° C., and after adding 0.1 part of p-methanehydroperoxide as a radical polymerization initiator, 0.07 part of sodium ethylenediamine tetraacetate, 0.05 part of ferrous sulfate heptahydrate and 0.15 part of sodium formaldehyde sulfoxylate and conducting polymerization for 12 hours, emulsions containing particles comprising crosslinked rubber 1 to 11 was obtained. The polymerization conversion rate was approximately 100%.

Next, aratic oil was added to the emulsion at 37.5 parts to 100 parts of solid content of the crosslinked rubber particle, and after coagulating this using sulfuric acid and salt and forming crumb, it was dried with a hot air drier to obtain particles comprising crosslinked rubber 1a to 11a containing the aromatic oil (hereinafter referred to aromatic oil-containing crosslinked rubber constituting particle).

TABLE 1

| Crosslinked rubber particle | 1 | 2 | 3 | 4 | 5 | 6 | 7 | 8 | 9 | 10 | 11 |
|---|---|---|---|---|---|---|---|---|---|---|---|
| Raw material Butadiene | 63 | 60 | 61 | 58 | 53 | 60 | 58 | 55 | 93 | 88 | 93 |
| Styrene | 35 | 35 | 35 | 35 | 35 | 35 | 35 | 35 | | | |
| Divinylbenzene | 2 | 2 | 2 | 2 | 2 | 2 | 2 | 2 | 2 | 2 | 2 |
| Methacrylic acid | | | 3 | | | | | | | | |
| 2-Hydroxyethyl methacrylate | | | | 2 | 5 | 10 | | | 5 | 10 | |
| Glycidyl methacrylate | | | | | | | 3 | 5 | 8 | | 5 |

[2] Production of a Conjugated Diene/Aromatic Vinyl Copolymeric Rubber

A polymerization vessel was charged with 200 parts of water, 4.5 parts of rosin acid soap and monomers with the compositions listed in Tables 2 and 3 (the units in Tables 2 and 3 are "parts"). The temperature of the polymerization vessel was then set to 5° C., and then 0.1 part of p-methanehydroperoxide as a radical polymerization initiator, 0.07 part of sodium ethylenediamine tetraacetate, 0.05 part of ferrous sulfate heptahydrate and 0.15 part of sodium formaldehyde sulfoxylate were added prior to polymerization. When the polymerization conversion rate reached about 60%, diethylhydroxylamine was added to suspend the polymerization, after which the unreacted monomer was recovered by steam stripping to obtain emulsion containing conjugated diene-based rubbers 1 to 11.

Next, aromatic oil was added to the emulsion at 37.5 parts to 100 parts of the conjugated diene/aromatic vinyl copolymeric rubber, and after coagulating this using sulfuric acid and salt and forming crumb, it was dried with a hot air drier to obtain conjugated diene/aromatic vinyl copolymeric rubbers 1b to 10b containing the aromatic oil.

The weight-average molecular weight of the conjugated diene/aromatic vinyl copolymeric rubbers was measured by GPC in terms of standard polystyrene.

TABLE 2

| Conjugated diene/aromatic vinyl copolymeric rubber | | 1 | 2 | 3 | 4 | 5 |
|---|---|---|---|---|---|---|
| Raw material | Butadiene | 58 | 57 | 56 | 55 | 57.5 |
| | Styrene | 42 | 42 | 42 | 42 | 42 |
| | Methacrylic acid | | 1 | | | |
| | Diethylaminoethyl methacrylate | | | 2 | | |
| | 4-Vinylpyridine | | | | 3 | |
| | 2-Hydroxyethyl methacrylate | | | | | 0.5 |
| Content | Styrene | 35.1 | 34.5 | 34.2 | 35.4 | 35.0 |
| | Methacrylic acid | | 0.8 | | | |
| | Diethylaminoethyl methacrylate | | | 1.9 | | |
| | 4-Vinylpyridine | | | | 2.5 | |
| | 2-Hydroxyethyl methacrylate | | | | | 0.4 |
| Butadiene unit | Vinyl content (wt %) | 17.3 | 17.0 | 17.7 | 17.5 | 17.0 |
| | 1,4-Trans content (wt %) | 65.9 | 66.3 | 64.5 | 65.3 | 66.4 |
| Weight-average molecular weight (× 10⁴) | | 67 | 71 | 69 | 65 | 70 |

TABLE 3

| Conjugated diene/aromatic vinyl copolymeric rubber | | 6 | 7 | 8 | 9 | 10 | 11 |
|---|---|---|---|---|---|---|---|
| Raw material | Butadiene | 57 | 55 | 57.5 | 57 | 57.5 | 72 |
| | Styrene | 42 | 42 | 42 | 42 | 42 | 28 |
| | 2-Hydroxyethyl methacrylate | 1 | 3 | | | | |
| | Glycidyl methacrylate | | | 0.5 | 1 | | |
| | γ-Methacryloxypropyl triisopropoxysilane | | | | | 0.5 | |
| Content | Styrene | 34.3 | 33.6 | 35.1 | 34.7 | 35.1 | 23.5 |
| | 2-Hydroxyethyl methacrylate | 0.7 | 2.4 | | | | |
| | Glycidyl methacrylate | | | 0.4 | 1.2 | | |
| | γ-Methacryloxypropyl triisopropoxysilane | | | | | 0.4 | |
| Butadiene unit | Vinyl content (wt %) | 17.2 | 17.0 | 17.5 | 17.3 | 17.8 | 17.3 |
| | 1,4-Trans content (wt %) | 64.9 | 66.6 | 65.7 | 64.8 | 65.1 | 66.0 |
| Weight-average molecular weight (× 10⁴) | | 68 | 71 | 65 | 68 | 66 | 47 |

[3] Wet Blending of the Crosslinked Rubber Particle and the Conjugated Diene/Aromatic Vinyl Copolymeric Rubber The emulsion containing the crosslinked rubber particle and the emulsion containing the conjugated diene/aromatic vinyl copolymeric rubber were mixed in the solid portion weight ratios shown in Table 4 to obtain wet blended rubbers 1 to 12. After then adding 37.5 parts of aromatic oil to 100 parts of solid of the particle comprising the crosslinked rubber and conjugated diene/aromatic vinyl copolymeric rubber in each of the blended emulsions and aggregating them using sulfuric acid and salt and forming crumb, they were dried with a hot air drier to obtain wet blended rubbers 1c to 11c containing aromatic oil. This wet blending allows more uniform blending of the particle comprising the crosslinked rubber and the conjugated diene/aromatic vinyl copolymeric rubber than by dry blending.

TABLE 4

| Wet mixing rubber from crosslinked rubber particle and conjugated diene/aromatic vinyl copolymeric rubber | | 1 | 2 | 3 | 4 | 5 | 6 | 7 | 8 | 9 | 10 | 11 | 12 |
|---|---|---|---|---|---|---|---|---|---|---|---|---|---|
| Crosslinked rubber particle | 1 | 10 | | | | | | | | | | | |
| | 4 | | 10 | 10 | | | | | | | | | |
| | 7 | | | | 10 | 10 | | | | | | | |
| | 9 | | | | | | 10 | | 10 | | | | 10 |
| | 10 | | | | | | | 10 | | | 10 | | |
| | 11 | | | | | | | | | 10 | | 10 | |
| Conjugated diene/aromatic vinyl copolymeric rubber | 1 | 90 | 90 | 90 | | | 90 | 90 | 90 | | | | |
| | 5 | | | | 90 | | | | | 90 | | | |
| | 8 | | | | | 90 | | | | | 90 | 90 | |
| | 11 | | | | | | | | | | | | 90 |

[4] Preparation and Estimation of Rubber Composition and Vulcanized Rubber

The aromatic oil-containing crosslinked rubber particles 1a to 11a and the aromatic oil-containing conjugated diene/aromatic vinyl copolymeric rubbers 1b to 10b obtained in described above were used to obtain rubber compositions by kneading with Labo Plastomill (product of Toyo Seiki Co., Ltd.) using the formulations listed in Tables 5 to 8. The number of the column "crosslinked rubber particle" in each Table means rubber content contained in the aromatic oil-containing crosslinked rubber particle, and the number of the column "conjugated diene/aromatic vinyl copolymeric rubber" means rubber content contained in the aromatic oil-containing conjugated diene/aromatic vinyl copolymeric rubber. The number of the column "content of aromatic oil contained" means total content of the aromatic oil content contained in the aromatic oil-containing crosslinked rubber particle and the aromatic oil content contained in the aromatic oil-containing conjugated diene/aromatic vinyl copolymeric rubber. After that, a vulcanizing press was then used for vulcanization at 160° C. for 20 minutes to obtain vulcanized rubbers (Examples 1 to 26). The aromatic oil-containing wet blended rubbers 1c to 11c and no aromatic oil-containing wet blended rubber 12 were used to obtain rubber compositions as similar to the described above, vulcanizing them to obtain vulcanized rubbers (Examples 27 to 41) in the same manner. In addition, using only the aromatic oil-containing conjugated diene/aromatic vinyl copolymeric rubber but the aromatic oil-containing crosslinked rubber particle and the aromatic oil-containing wet blended rubber, rubber compositions were obtained in the same manner shown in Tables 9, 10, 12 and 13, then they were vulcanized to vulcanized rubber (Comparative examples 1 to 13). Example 41 and comparative example 13 are the ones which 10 parts of the aromatic oil were added to the prescribed non-extended rubber. In Table 13, natural rubber and butadiene rubber (JSR Corp., Trade name: "JSR BR01") as the other rubber component except the aromatic oil-containing crosslinked rubber particle and the aromatic oil-containing conjugated diene/aromatic vinyl copolymeric rubber, were used.

The properties of the rubber compositions and vulcanized rubbers of Examples 1 to 40 and Comparative examples 1 to 12 were then measured. The results are shown in Tables 5 to 13.

The components incorporated in the formulations described above were as follows.
(i) Silica; NIPPON SILICA INDUSTRIAL Co., Ltd., Trade name: "NIPSIL AQ"
(ii) Aluminum hydroxide; Showa Denko K. K., Trade name: "HIGILITE H-43"
(iii) Carbon black; MITSUBISHI CHEMICAL Co., Ltd., Trade name: "DIABLACK N220"
(iv) Silane coupling agent; DEGUSSA HULS, Trade name: "Si69"
(v) Anti-aging agent; OUCHISHINKO CHEMICAL INDUSTRIAL CO., LTD., Trade name: "NOCRAC 810NA"
(vi) Vulcanization accelerator (I); OUCHISHINKO CHEMICAL INDUSTRIAL CO., LTD., Trade name: "NOCCELER CZ"
(vii) Vulcanization accelerator (II); OUCHISHINKO CHEMICAL INDUSTRIAL CO., LTD., Trade name: "NOCCELER D"

The bound contents of the monomers and properties were measured by the following methods.

(a) Bound styrene content (% by weight): Determined from a calibration curve prepared by infrared absorption spectrometry.
(b) Vinyl bond content and 1,4-trans bond content of butadiene unit (% by weight): Determined by infrared absorption spectrometry (Morello method).
(c) Bound carboxylic group-containing monomer content (% by weight): A procedure of dissolution of the rubber in toluene and reprecipitation with methanol was carried out twice, and then after purification and vacuum drying, the reprecipitated rubber was dissolved in chloroform and the monomer bond content determined by neutralization titration.
(d) Bound amino group-containing monomer content (% by weight): A procedure of dissolution of the rubber in toluene and reprecipitation with methanol was carried out twice, and then after purification and vacuum drying, elemental analysis was performed on the precipitated rubber and the nitrogen content was calculated.
(e) Bound hydroxyl group-containing monomer content (% by weight): A procedure of dissolution of the rubber in toluene and reprecipitation with methanol was carried out twice, and then after purification and vacuum drying, measurement was performed on the precipitated rubber by using 270 MHz $^1$H-NMR.
(f) Bound epoxy group-containing monomer content (% by weight): A procedure of dissolution of the rubber in toluene and reprecipitation with methanol was carried out twice, and then after purification and vacuum drying, measurement was performed on the precipitated rubber by titration according to the Jay method [R. R. Jay; Anal. Chem., 36, 667(1964)].
(g) Bound alkoxysilyl group-containing monomer content (% by weight): A procedure of dissolution of the rubber in toluene and reprecipitation with methanol was carried out twice, and then after purification and vacuum drying, measurement was performed on the precipitated rubber by using 270 MHz $^1$H-NMR.

(h) Proccessability; A rubber composition was evaluated based on its winding around a roll upon kneaded using the roll. The evaluation criteria are shown below.

⊚: Excellent with no separation form roll surface.

○: Satisfactory with slight separation.

Δ: Poor winding with frequent separation.

X: Extremely poor with almost no winding.

(i) Shrinkage of unvulcanized rubber sheet; Evaluation was based on the degree of shrinkage of an unvulcanized rubber sheet after kneading a rubber composition by a roll and also based on the surface condition when assessed visually. The evaluation criteria are shown below.

⊚: Excellent with extremely low shrinkage and, smooth and glossy surface of unvalcanized rubber sheet.

○: Satisfactory with slight shrinkage and smooth surface of unvulcanized rubber sheet.

Δ: Poor with shrinkage.

X: Extremely poor with extremely high shrinkage and crack in edge of unvulcanized rubber sheet.

(j) Mooney viscosity [$ML_{1+4}$ (100° C.)]: This was measured according to JIS K 6300–1994, under conditions with a measuring temperature of 100° C., 1 minute of preheating and 4 minutes of measurement.

(k) Tensile properties: Elongation at the time of breaking (%) and tensile strength (MPa) were measured according to JIS K 6301-1995 using a #3 test piece sample under conditions with a measuring temperature of 25° C. and a pull rate of 500 mm/min.

(l) Impact resilience: This was measured at 50° C. using a Dunlop tripsometer.

(m) tan δ: This was measured using a Rheometrix (U.S.) Dynamic Analyzer (RDA) under conditions with dynamic deformation of 3%, a frequency of 10 Hz and a measuring temperature of 50° C. A smaller value indicates lower rolling resistance, and therefore more satisfactory.

(n) Lambourn wear Index: A Lambourn wear tester was used and the degree of wear with a slip rate of 60% was calculated. The measuring temperature was 50° C. A larger Index indicates more satisfactory wear resistance.

TABLE 5

| | | | | | Example | | | | | |
|---|---|---|---|---|---|---|---|---|---|---|
| | | | | 1 | 2 | 3 | 4 | 5 | 6 | 7 |
| Rubber component | Crosslinked rubber particle | | 1a | 10 | | | | | | |
| | | | 2a | | 10 | 10 | | | | |
| | | | 3a | | | | | | 10 | |
| | | | 4a | | | | 10 | | | 10 |
| | | | 7a | | | | | 10 | | |
| | Conjugated diene/aromatic vinyl copolymeric rubber | | 1b | 90 | 90 | | 90 | 90 | | |
| | | | 2b | | | 90 | | | | |
| | | | 5b | | | | | | 90 | 90 |
| | Content of aromatic oil contained | | | 37.5 | 37.5 | 37.5 | 37.5 | 37.5 | 37.5 | 37.5 |
| Silica | | | | 60 | 60 | 60 | 60 | 60 | 60 | 60 |
| Carbon black | | | | 10 | 10 | 10 | 10 | 10 | 10 | 10 |
| Silane coupling agent | | | | 3 | 3 | 0 | 3 | 3 | 3 | 0 |
| Zinc oxide | | | | 3 | 3 | 3 | 3 | 3 | 3 | 3 |
| Stearic acid | | | | 2 | 2 | 2 | 2 | 2 | 2 | 2 |
| Anti-aging agent | | | | 1 | 1 | 1 | 1 | 1 | 1 | 1 |
| Sulfur | | | | 2.2 | 2.2 | 2.2 | 2.2 | 2.2 | 2.2 | 5.0 |
| Vulcanization accelerator | | (I) | | 1.5 | 1.5 | 1.5 | 1.5 | 1.5 | 1.5 | 1.5 |
| | | (II) | | 1 | 1 | 1 | 1 | 1 | 1 | 1 |
| Processability | | | | ⊚ | ⊚ | ⊚ | ⊚ | ⊚ | ⊚ | ⊚ |
| Shrinkage of unvulcanized rubber sheet | | | | ○ | ○ | ○ | ⊚ | ⊚ | ⊚ | ⊚ |
| Mooney viscosity [$ML_{1+4}$(100° C.)] | | | | 57 | 58 | 65 | 67 | 65 | 76 | 82 |
| Elongation (%) | | | | 370 | 360 | 350 | 350 | 360 | 350 | 370 |
| Tensile strength (MPa) | | | | 19 | 20 | 18 | 19 | 20 | 19 | 20 |
| Impact resilience (%) | | | | 51 | 52 | 52 | 52 | 51 | 55 | 56 |
| 3% tan δ (50° C.) | | | | 0.16 | 0.14 | 0.11 | 0.15 | 0.14 | 0.09 | 0.09 |
| Lambourn wear Index | | | | 101 | 105 | 110 | 115 | 118 | 115 | 117 |

TABLE 6

| | | | | Example | | | | | | |
|---|---|---|---|---|---|---|---|---|---|---|
| | | | | 8 | 9 | 10 | 11 | 12 | 13 | 14 |
| Rubber component | Crosslinked rubber particle | | 4a | | 10 | 10 | | | | |
| | | | 5a | 10 | | | | | | |
| | | | 6a | | | | 10 | | | |
| | | | 7a | | | | | 10 | | 10 |
| | | | 8a | | | | | | 10 | |
| | Conjugated diene/aromatic vinyl copolymeric rubber | | 5b | 90 | | | | | | |
| | | | 6b | | 90 | | | | | |
| | | | 7b | | | 90 | | | | |
| | | | 8b | | | | 90 | 90 | 90 | |
| | | | 9b | | | | | | | 90 |

TABLE 6-continued

| | | | Example | | | | | | |
|---|---|---|---|---|---|---|---|---|---|
| | | | 8 | 9 | 10 | 11 | 12 | 13 | 14 |
| | Content of aromatic oil contained | | 37.5 | 37.5 | 37.5 | 37.5 | 37.5 | 37.5 | 37.5 |
| Silica | | | 60 | 60 | 60 | 60 | 60 | 60 | 60 |
| Carbon black | | | 10 | 10 | 10 | 10 | 10 | 10 | 10 |
| Silane coupling agent | | | 3 | 0 | 3 | 3 | 0 | 0 | 3 |
| Zinc oxide | | | 3 | 3 | 3 | 3 | 3 | 3 | 3 |
| Stearic acid | | | 2 | 2 | 2 | 2 | 2 | 2 | 2 |
| Anti-aging agent | | | 1 | 1 | 1 | 1 | 1 | 1 | 1 |
| Sulfur | | | 2.2 | 5.0 | 2.2 | 2.2 | 5.0 | 5.0 | 2.2 |
| Vulcanization accelerator | | (I) | 1.5 | 1.5 | 1.5 | 1.5 | 1.5 | 1.5 | 1.5 |
| | | (II) | 1 | 1 | 1 | 1 | 1 | 1 | 1 |
| Processability | | | ◎ | ○ | ◎ | ◎ | ◎ | ◎ | ◎ |
| Shrinkage of unvulcanized rubber sheet | | | ◎ | ◎ | ◎ | ◎ | ◎ | ◎ | ◎ |
| Mooney viscosity [$ML_{1+4}(100°C.)$] | | | 80 | 85 | 89 | 67 | 73 | 75 | 80 |
| Elongation (%) | | | 360 | 310 | 300 | 270 | 280 | 270 | 150 |
| Tensile strength (MPa) | | | 19 | 21 | 18 | 17 | 18 | 17 | 15 |
| Impact resilience (%) | | | 55 | 56 | 57 | 55 | 56 | 57 | 54 |
| 3% tan δ (50° C.) | | | 0.10 | 0.09 | 0.09 | 0.10 | 0.09 | 0.09 | 0.11 |
| Lambourn wear Index | | | 113 | 117 | 118 | 117 | 125 | 120 | 112 |

TABLE 7

| | | | Example | | | | | |
|---|---|---|---|---|---|---|---|---|
| | | | 15 | 16 | 17 | 18 | 19 | 20 |
| Rubber component | Crosslinked rubber particle | 2a | 10 | 10 | | | | |
| | | 4a | | | 10 | 10 | 10 | 10 |
| | Conjugated diene/aromatic vinyl copolymeric rubber | 2b | | | 90 | | | |
| | | 3b | 90 | | | 90 | | |
| | | 5b | | 90 | | | | |
| | | 8b | | | | | 90 | |
| | | 10b | | | | | | 90 |
| | Content of aromatic oil contained | | 37.5 | 37.5 | 37.5 | 37.5 | 37.5 | 37.5 |
| Silica | | | 60 | 60 | 60 | 60 | 60 | 60 |
| Aluminum hydroxide | | | | | | | | |
| Carbon black | | | 10 | 10 | 10 | 10 | 10 | 10 |
| Silane coupling agent | | | 3 | 3 | 3 | 3 | 3 | 3 |
| Zinc oxide | | | 3 | 3 | 3 | 3 | 3 | 3 |
| Stearic acid | | | 2 | 2 | 2 | 2 | 2 | 2 |
| Anti-aging agent | | | 1 | 1 | 1 | 1 | 1 | 1 |
| Sulfur | | | 2.2 | 2.2 | 2.2 | 2.2 | 2.2 | 2.2 |
| Vulcanization accelerator | | (I) | 1.5 | 1.5 | 1.5 | 1.5 | 1.5 | 1.5 |
| | | (II) | 1 | 1 | 1 | 1 | 1 | 1 |
| Processability | | | ◎ | ◎ | ◎ | ◎ | ◎ | ◎ |
| Shrinkage of unvulcanized rubber sheet | | | ○ | ○ | ◎ | ◎ | ◎ | ◎ |
| Mooney viscosity [$ML_{1+4}(100°C.)$] | | | 72 | 78 | 63 | 68 | 67 | 78 |
| Elongation (%) | | | 320 | 300 | 330 | 350 | 270 | 300 |
| Tensile strength (MPa) | | | 20 | 21 | 19 | 19 | 16 | 17 |
| Impact resilience (%) | | | 50 | 54 | 50 | 55 | 54 | 50 |
| 3% tan δ (50° C.) | | | 0.14 | 0.1 | 0.14 | 0.09 | 0.09 | 0.09 |
| Lambourn wear Index | | | 120 | 115 | 110 | 120 | 117 | 121 |

TABLE 8

| | | | Example | | | | | | | | |
|---|---|---|---|---|---|---|---|---|---|---|---|
| | | | 21 | 22 | 23 | 24 | 25 | 26 | 27 | 28 | 29 |
| Rubber component | Crosslinked rubber particle | 7a | 10 | 10 | 10 | | | | | | |
| | | 9a | | | | 10 | | | 10 | 10 | |
| | | 10a | | | | | 10 | | | | |
| | | 11a | | | | | | 10 | | | 10 |
| | Conjugated diene/aromatic vinyl copolymeric rubber | 1b | | | | 90 | 90 | 90 | | | |
| | | 4b | 90 | | | | | | | | |
| | | 5b | | 90 | | | | | 90 | | |
| | | 8b | | | | | | | | 90 | 90 |
| | | 10b | | | 90 | | | | | | |
| | Aromatic oil | | 37.5 | 37.5 | 37.5 | 37.5 | 37.5 | 37.5 | 37.5 | 37.5 | 37.5 |
| Silica | | | 60 | 60 | 60 | 60 | 60 | 60 | 60 | 60 | 60 |
| Carbon black | | | 10 | 10 | 10 | 10 | 10 | 10 | 10 | 10 | 10 |

TABLE 8-continued

|  |  | Example | | | | | | | | |
|---|---|---|---|---|---|---|---|---|---|---|
|  |  | 21 | 22 | 23 | 24 | 25 | 26 | 27 | 28 | 29 |
| Silane coupling agent |  | 3 | 0 | 3 | 3 | 3 | 3 | 3 | 3 | 3 |
| Zinc oxide |  | 3 | 3 | 3 | 3 | 3 | 3 | 3 | 3 | 3 |
| Stearic acid |  | 2 | 2 | 2 | 2 | 2 | 2 | 2 | 2 | 2 |
| Anti-aging agent |  | 1 | 1 | 1 | 1 | 1 | 1 | 1 | 1 | 1 |
| Sulfur |  | 2.2 | 5.0 | 2.2 | 2.2 | 2.2 | 2.2 | 2.2 | 2.2 | 2.2 |
| Vulcanization accelerator | (I) | 1.5 | 1.5 | 1.5 | 1.5 | 1.5 | 1.5 | 1.5 | 1.5 | 1.5 |
|  | (II) | 1 | 1 | 1 | 1 | 1 | 1 | 1 | 1 | 1 |
| Processability |  | ⊚ | ⊚ | ⊚ | ⊚ | ⊚ | ⊚ | ⊚ | ⊚ | ⊚ |
| Shrinkage of unvulcanized rubber sheet |  | ⊚ | ⊚ | ⊚ | ⊚ | ⊚ | ⊚ | ⊚ | ⊚ | ⊚ |
| Mooney viscosity [$ML_{1+4}$(100° C.)] |  | 70 | 78 | 78 | 68 | 69 | 66 | 75 | 70 | 78 |
| Elongation (%) |  | 280 | 310 | 300 | 350 | 350 | 360 | 290 | 290 | 300 |
| Tensile strength (MPa) |  | 18 | 20 | 16 | 19 | 20 | 20 | 20 | 18 | 19 |
| Impact resilience (%) |  | 55 | 55 | 50 | 53 | 54 | 52 | 56 | 55 | 56 |
| 3% tan δ (50° C.) |  | 0.09 | 0.09 | 0.09 | 0.14 | 0.13 | 0.13 | 0.08 | 0.08 | 0.08 |
| Lambourn wear Index |  | 125 | 120 | 125 | 118 | 120 | 120 | 121 | 120 | 128 |

TABLE 9

|  |  |  | Comparative example | | | | |
|---|---|---|---|---|---|---|---|
|  |  |  | 1 | 2 | 3 | 4 | 5 |
| Rubber component | Conjugated diene/aromatic vinyl copolymeric rubber | 1b | 100 | 100 |  |  |  |
|  |  | 2b |  |  | 100 |  |  |
|  |  | 3b |  |  |  | 100 |  |
|  |  | 4b |  |  |  |  | 100 |
|  | Content of aromatic oil contained |  | 37.5 | 37.5 | 37.5 | 37.5 | 37.5 |
| Silica |  |  | 60 | 60 | 60 | 60 | 60 |
| Carbon black |  |  | 10 | 10 | 10 | 10 | 10 |
| Silane coupling agent |  |  | 6 | 3 | 6 | 3 | 6 |
| Zinc oxide |  |  | 3 | 3 | 3 | 3 | 3 |
| Stearic acid |  |  | 2 | 2 | 2 | 2 | 2 |
| Anti-aging agent |  |  | 1 | 1 | 1 | 1 | 1 |
| Sulfur |  |  | 1.5 | 2.2 | 1.5 | 2.2 | 1.5 |
| Vulcanization accelerator |  | (I) | 1.5 | 1.5 | 1.5 | 1.5 | 1.5 |
|  |  | (II) | 1 | 1 | 1 | 1 | 1 |
| Processability |  |  | ○ | x | Δ | x | x |
| Shrinkage of unvulcanized rubber sheet |  |  | Δ | Δ | x | x | Δ |
| Mooney viscosity [$ML_{1+4}$(100° C.)] |  |  | 47 | 62 | 58 | 53 | 59 |
| Elongation (%) |  |  | 380 | 390 | 320 | 370 | 220 |
| Tensile strength (MPa) |  |  | 21 | 21 | 19 | 20 | 19 |
| Impact resilience (%) |  |  | 49 | 50 | 47 | 52 | 53 |
| 3% tan δ (50° C.) |  |  | 0.19 | 0.18 | 0.20 | 0.15 | 0.12 |
| Lambourn wear Index |  |  | 100 | 88 | 105 | 108 | 117 |

TABLE 10

|  |  |  | Comparative example | | | |
|---|---|---|---|---|---|---|
|  |  |  | 6 | 7 | 8 | 9 |
| Rubber component | Conjugated diene/aromatic vinyl copolymeric rubber | 5b | 100 |  |  |  |
|  |  | 6b |  | 100 |  |  |
|  |  | 9b |  |  | 100 |  |
|  |  | 10b |  |  |  | 100 |
|  | Content of aromatic oil contained |  | 37.5 | 37.5 | 37.5 | 37.5 |
| Silica |  |  | 60 | 60 | 60 | 60 |
| Carbon black |  |  | 10 | 10 | 10 | 10 |
| Silane coupling agent |  |  | 3 | 6 | 3 | 6 |
| Zinc oxide |  |  | 3 | 3 | 3 | 3 |
| Stearic acid |  |  | 2 | 2 | 2 | 2 |
| Anti-aging agent |  |  | 1 | 1 | 1 | 1 |
| Sulfur |  |  | 1.5 | 2.2 | 1.5 | 1.5 |
| Vulcanization accelerator | (I) |  | 1.5 | 1.5 | 1.5 | 1.5 |
|  | (II) |  | 1 | 1 | 1 | 1 |
| Processability |  |  | Δ | x | Δ | x |
| Shrinkage of unvulcanized rubber sheet |  |  | Δ | x | Δ | Δ |
| Mooney viscosity [$ML_{1+4}$(100° C.)] |  |  | 65 | 76 | 83 | 85 |
| Elongation (%) |  |  | 380 | 320 | 150 | 270 |
| Tensile strength (MPa) |  |  | 22 | 21 | 17 | 16 |

TABLE 10-continued

|  | Comparative example | | | |
|---|---|---|---|---|
|  | 6 | 7 | 8 | 9 |
| Impact resilience (%) | 55 | 57 | 53 | 5 |
| 3% tan δ (50° C.) | 0.11 | 0.10 | 0.12 | 0.12 |
| Lambourn wear Index | 120 | 115 | 115 | 115 |

TABLE 11

|  |  |  | Example | | | | |
|---|---|---|---|---|---|---|---|
|  |  |  | 30 | 31 | 32 | 33 | 34 |
| Rubber component | Wet mixing rubber | 1c | 100 |  |  |  |  |
|  |  | 2c |  | 100 |  |  |  |
|  |  | 3c |  |  | 100 |  |  |
|  |  | 4c |  |  |  | 100 |  |
|  |  | 5c |  |  |  |  | 100 |
|  | Content of aromatic oil contained |  | 37.5 | 37.5 | 37.5 | 37.5 | 37.5 |
| Silica |  |  | 60 | 60 | 60 | 60 | 60 |
| Carbon black |  |  | 10 | 10 | 10 | 10 | 10 |
| Silane coupling agent |  |  | 3 | 3 | 3 | 3 | 3 |
| Zinc oxide |  |  | 3 | 3 | 3 | 3 | 3 |
| Stearic acid |  |  | 2 | 2 | 2 | 2 | 2 |
| Anti-aging agent |  |  | 1 | 1 | 1 | 1 | 1 |
| Sulfur |  |  | 2.2 | 2.2 | 2.2 | 2.2 | 2.2 |
| Vulcanization accelerator |  | (I) | 1.5 | 1.5 | 1.5 | 1.5 | 1.5 |
|  |  | (II) | 1 | 1 | 1 | 1 | 1 |
| Processability |  |  | ◉ | ◉ | ◉ | ◉ | ◉ |
| Shrinkage of unvulcanized rubber sheet |  |  | ○ | ◉ | ◉ | ◉ | ◉ |
| Mooney viscosity [ML$_{1+4}$(100° C.)] |  |  | 54 | 65 | 65 | 79 | 70 |
| Elongation (%) |  |  | 390 | 370 | 370 | 370 | 290 |
| Tensile strength (MPa) |  |  | 21 | 21 | 21 | 20 | 19 |
| Impact resilience (%) |  |  | 54 | 55 | 53 | 56 | 56 |
| 3% tan δ (50° C.) |  |  | 0.10 | 0.13 | 0.12 | 0.08 | 0.08 |
| Lambourn wear Index |  |  | 110 | 119 | 120 | 119 | 125 |

TABLE 12

|  |  |  |  | Example | | | | Comparative example | Example | Comparative example |
|---|---|---|---|---|---|---|---|---|---|---|
|  |  |  |  | 35 | 36 | 37 | 38 | 10 | 41 | 13 |
| Rubber component | Wet mixing rubber |  | 6c | 100 |  |  |  |  |  |  |
|  |  |  | 7c |  | 100 |  | 100 |  |  |  |
|  |  |  | 8c |  |  | 100 |  |  |  |  |
|  |  |  | 12 |  |  |  |  |  | 100 |  |
|  | Conjugated diene/aromatic vinyl copolymeric rubber |  | 1b |  |  |  |  | 100 |  |  |
|  |  |  | 11b |  |  |  |  |  |  | 100 |
|  | Content of aromatic oil contained |  |  | 37.5 | 37.5 | 37.5 | 37.5 | 37.5 | *10 | *10 |
| Silica |  |  |  | 60 | 60 | 60 | 55 | 55 | 45 | 45 |
| Aluminum hydroxide |  |  |  |  |  |  | 10 | 10 |  |  |
| Carbon black |  |  |  | 10 | 10 | 10 | 10 | 10 | 5 | 5 |
| Silane coupling agent |  |  |  | 3 | 3 | 3 | 6 | 6 | 4.5 | 4.5 |
| Zinc oxide |  |  |  | 3 | 3 | 3 | 3 | 3 | 3 | 3 |
| Stearic acid |  |  |  | 2 | 2 | 2 | 2 | 2 | 2 | 2 |
| Anti-aging agent |  |  |  | 1 | 1 | 1 | 1 | 1 | 1 | 1 |
| Sulfur |  |  |  | 2.2 | 2.2 | 2.2 | 1.5 | 1.5 | 1.5 | 1.5 |
| Vulcanization accelerator |  |  | (I) | 1.5 | 1.5 | 1.5 | 1.5 | 1.5 | 1.5 | 1.5 |
|  |  |  | (II) | 1 | 1 | 1 | 1 | 1 | 1 | 1 |
| Processability |  |  |  | ◉ | ◉ | ◉ | ◉ | Δ | Δ | ◉ |
| Shrinkage of unvulcanized rubber sheet |  |  |  | ◉ | ◉ | ◉ | ◉ | x | x | ○ |
| Mooney viscosity [ML$_{1+4}$(100° C.)] |  |  |  | 66 | 67 | 66 | 64 | 60 | 56 | 53 |
| Elongation (%) |  |  |  | 370 | 370 | 370 | 400 | 400 | 430 | 440 |
| Tensile strength (MPa) |  |  |  | 21 | 21 | 21 | 20 | 19 | 20 | 19 |
| Impact resilience (%) |  |  |  | 56 | 57 | 54 | 52 | 51 | 60 | 55 |
| 3% tan δ (50° C.) |  |  |  | 0.12 | 0.11 | 0.12 | 0.16 | 0.17 | 0.08 | 0.11 |
| Lambourn wear Index |  |  |  | 122 | 123 | 121 | 103 | 92 | 112 | 100 |

*amount of added aromatic oil when incorporating

TABLE 13

|  |  |  | Example | | Comparative example | |
|---|---|---|---|---|---|---|
|  |  |  | 39 | 40 | 11 | 12 |
| Rubber component | Conjugated diene/aromatic vinyl copolymeric rubber | 1 |  |  | 70 | 70 |
|  | Wet mixing rubber | 2 | 70 | 70 |  |  |
|  | Content of aromatic oil contained |  | 26.25 | 26.25 | 26.25 | 26.25 |
|  | Natural rubber |  | 30 |  | 30 |  |
|  | Butadiene rubber |  |  | 30 |  | 30 |
| Silica |  |  | 60 | 60 | 60 | 60 |
| Carbon black |  |  | 10 | 10 | 10 | 10 |
| Silane coupling agent |  |  | 6 | 6 | 6 | 6 |
| Zinc oxide |  |  | 3 | 3 | 3 | 3 |
| Stearic acid |  |  | 2 | 2 | 2 | 2 |
| Anti-aging agent |  |  | 1 | 1 | 1 | 1 |
| Sulfur |  |  | 1.5 | 1.5 | 1.5 | 1.5 |
| Vulcanization accelerator |  | (I) | 1.5 | 1.5 | 1.5 | 1.5 |
|  |  | (II) | 1 | 1 | 1 | 1 |
| Processability |  |  | ⊚ | ○ | ○ | Δ |
| Shrinkage of unvulcanized rubber sheet |  |  | ⊚ | ⊚ | Δ | Δ |
| Mooney viscosity [$ML_{1+4}(100°\ C.)$] |  |  | 58 | 56 | 54 | 52 |
| Elongation (%) |  |  | 350 | 350 | 350 | 355 |
| Tensile strength (MPa) |  |  | 19 | 19 | 19 | 18 |
| Impact resilience (%) |  |  | 59 | 59 | 58 | 57 |
| 3% tan δ (50° C.) |  |  | 0.13 | 0.13 | 0.13 | 0.13 |
| Lambourn wear Index |  |  | 115 | 118 | 110 | 114 |

Result of Examination

According to the results in Tables 5, 6, 7, 8, 11 and 12, the rubber compositions of Examples 1–38 all showed excellence in proccessability and dimensional stability, and their vulcanized rubbers showed satisfactory properties. Since impact resilience was especially high and tan δ was especially small, rolling resistance can be reduced when these are used in tires. Lambourn wear Index was also adequately large, demonstrating that vulcanized rubbers having an excellent wear resistance can be obtained. Even examples containing no silane coupling agent showed excellent characterization of the unvulcanized rubber composition and the vulcanized rubber. Comparing Example 1 and Comparative example 2 whose amounts of both incorporated silane coupling agent are 3 parts, Lambourn wear Index of Comparative example 1 is 88, but that of Example 1 is 101 and Example 1 is much improved. And according to the result (Examples 39 and 40) in Table 13, even if a diene-based rubber in addition to the crosslinked rubber particle and the conjugated diene/aromatic vinyl copolymeric rubber was used, it was found that rubber compositions are excellent in proccessability and dimensional stability, and that good vulcanized rubbers in impact resilience and Lambourn wear Index are obtained.

On the other hand, according to the results in Tables 9 and 10 (Comparative examples 1 to 9), Table 12 (Comparative example 10) and Table 13 (Comparative examples 11 and 12), examples except Comparative example 1 are poor in proccessability, examples except Comparative examples 6, 7, 11 and 12 are poor in impact resilience, and all Comparative examples are also poor in tan δ and Lambourn wear Index and lead to no well-balanced vulcanized rubbers in all characterization. It is therefore concluded that the rubber compositions of the comparative examples cannot give vulcanized rubbers useful for tires having low rolling resistance and excellent and stable properties including wear resistance.

Effect of the Invention

The rubber composition of the present invention shows good proccessability and makes a vulcanized rubber whose rolling resistance is low and whose wet skid resistance and wear resistance are excellent, which is therefore useful for tires.

What is claimed is:

1. A rubber composition comprising
a crosslinked rubber particle comprising polymerized units of, (a1) 40 to 79.99% by weight of a conjugated diene monomer unit, (a2) 20 to 50% by weight of an aromatic vinyl monomer unit, and (a3) 0.01 to 10% by weight of a monomer unit having at least two polymerizable unsaturated groups with respect to 100% by weight of the total of (a1), (a2) and (a3), and
a conjugated diene/aromatic vinyl copolymeric rubber wherein the vinyl bond content of the conjugated diene unit is 10 to 30% by weight and the 1,4-trans bond content exceeds 55% by weight.

2. A rubber composition comprising
crosslinked rubber particle comprising polymerized units of (b1) 40 to 99.89% by weight of a conjugated diene monomer unit, (b2) 0 to 50% by weight of an aromatic vinyl monomer unit, (b3) 0.01 to 10% by weight of a monomer unit having at least two polymerizable unsaturated groups, and (b4) 0.1 to 30% by weight of a monomer unit having one polymerizable unsaturated group and at least one functional group selected from the group consisting of carboxylic group, hydroxyl group and epoxy group with respect to 100% by weight of the total of (b1), (b2), (b3) and (b4), and
a conjugated diene/aromatic vinyl copolymeric rubber wherein the vinyl bond content of the conjugated diene unit is 10 to 30% by weight and the 1,4-trans bond content exceeds 55% by weight.

3. The rubber composition according to claim 2, wherein the content of said conjugated diene monomer unit (b1) is 40 to 79.89% by weight, the content of said aromatic vinyl monomer unit (b2) is 20 to 50% by weight, and said monomer unit (b4) has one polymerizable unsaturated group and at least one functional group selected from the group consisting of a hydroxyl group and an epoxy group.

4. The rubber composition according to claim 2, wherein the content of said aromatic vinyl monomer unit (b2) is zero, and said monomer unit (b4) has one polymerizable unsaturated group and at least one functional group selected from the group consisting of a hydroxyl group and an epoxy group.

5. The rubber composition according to any one of claims 1, wherein,
said conjugated diene unit (a1) is at least one selected from the group consisting of 1,3-butadiene, 2,3-dimethyl-1,3-butadiene, isoprene and chloroprene;
said aromatic vinyl monomer unit is at least one selected from the group consisting of styrene, 2-methylstyrene, 3-methylstyrene, 4-methylstyrene, α-methylstyrene, 2,4-dimethylstyrene, 2,4-diisopropylstyrene, 4-tertbutylstyrene and tert-butoxystyrene; and
said monomer unit having said polymerizable unsaturated group is at least one selected from the group consisting of ethylene glycol di(meth)acrylate, propylene glycol di(meth)acrylate, 1,4-butanediol di(meth)acrylate, 1,6-hexanediol di(meth)acrylate, trimethylolpropane di(meth)acrylate, trimethylolpropane tri(meth)acrylate, pentaerythritol tri(meth)acrylate, pentaerythritol tetra (meth)acrylate, divinylbenzene, diisopropenylbenzene and trivinylbenzene.

6. The rubber composition according to any one of claim 1 wherein,
said conjugated diene unit of the conjugated diene/aromatic vinyl copolymeric rubber is at least one selected from the group consisting of 1,3-butadiene, 2,3-dimethyl-1,3-butadiene, isoprene and chloroprene, and
said aromatic vinyl monomer unit of the conjugated diene/aromatic vinyl copolymeric rubber is at least one selected from the group consisting of styrene, 2-methylstyrene, 3-methylstyrene, 4-methylstyrene, α-methylstyrene, 2,4-dimethylstyrene, 2,4-diisopropylstyrene, 4-tert-butylstyrene and tert-butoxystyrene.

7. The rubber composition according to any one of claim 1, wherein the conjugated diene/aromatic vinyl copolymeric rubber further comprises at least one polymerized monomer unit selected from the group consisting of (meth)acrylonitrile, vinylidene cyanide, vinyl chloride, vinylidene chloride, (meth)acrylamide, maleimide, methyl(meth)acrylate, ethyl (meth)acrylate, n-propyl (meth)acrylate, isopropyl (meth)acrylate, n-butyl (meth)acrylate, iso-butyl (meth)acrylate, sec-butyl (meth)acrylate, tert-butyl (meth)acrylate, n-amyl(meth)acrylate, n-hexyl (meth)acrylate, 2-ethylhexyl (meth)acrylate and cyclohexyl (meth)acrylate.

8. The rubber composition according to claim 1 wherein said conjugated diene/aromatic vinyl copolymeric rubber comprises a monomer having one polymerizable unsaturated group and at least one functional group selected from the group consisting of carboxylic group, amino group, hydroxyl group, epoxy group and alkoxysilyl group, and is present in an amount of 0.1 to 30% by weight with respect to said conjugated diene/aromatic vinyl copolymeric rubber.

9. The rubber composition according to claim 8, wherein the conjugated diene/aromatic vinyl copolymeric rubber comprises polymerized units of at least one selected from the group consisting of
(meth)acrylic acid, maleic acid, fumaric acid, itaconic acid, tetraconic acid, cinnamic acid; a monoester of phthalic acid, succinic acid or adipic acid with (meth) allylalcohol or 2-hydroxyethyl (meth)acrylate; and salts thereof.

10. The rubber composition according to claim 2 wherein said monomer unit (b4) is at least one selected from the group consisting of
a carboxyl group containing compound
a hydroxyl group containing compound
and an epoxy group containing compound.

11. The rubber composition according to claim 1, further comprising at least one reinforcing filler selected from the group consisting of the inorganic compound represented by the formula (I), silica and carbon black $$mM_1 \cdot xSiO_y \cdot zH_2O \qquad (I)$$

wherein $M_1$ is at least one selected from the group consisting of Al, Mg, Ti, and Ca; an oxide thereof; and an hydroxide thereof; and m, x, y, and z are integers from 1 to 5, 0 to 10, 2 to 5, and 0 to 10, respectively.

12. The rubber composition according to any one of claim 2, wherein,
said conjugated diene unit (b1) is at least one selected form the group consisting of 1,3-butadiene, 2,3-dimethyl-1,3-butadiene, isoprene and chloroprene,
said aromatic vinyl monomer unit (b2) is at least one selected from the group consisting of styrene, 2-mthylstyrene, 3-methylstyrene, 4-methylstyrene, α-methylstyrene, 2,4-dimethylstyrene, 2,4-diisopropylstyrene, 4-tertbutylstyrene and ter-butoxystyrene, and
said monomer unit having said polymerizable unsaturated group (b4) is at least one selected from the group consisting of ethylene glycol di(meth)acrylate, propylene glycol di(meth)acrylate, 1,4-butanediol di(meth) acrylate, 1,6-hexanediol di(meth)acylate, trimethylopropane di(meth)acrylate, trimethylolpropane tri(meth)acrylate, pentaerythritol tri(meth)acrylate, pentaerythritol tetra(meth)acrylate, divinylbenzene, diisopropenylbenzene and trivinylbenzene.

13. The rubber composition according to claim 2 wherein the conjugated diene unit of said conjugated diene/aromatic vinyl copolymeric rubber is at least one selected from the group consisting of 1,3-butadiene, 2,3-dimethyl-1,3-butadiene, isoprene and chloroprene, and
said aromatic vinyl monomer unit of said conjugated diene/aromatic vinyl copolymeric rubber is at least one selected from the group consisting of styrene, 2-methylstyrene, 3-methylstyrene, 4-methylstyrene, α-methylstyrene, 2,4-dimethylstyrene, 2,4-diisopropylstyrene, 4-ter-butylstyrene and tert-butoxystyrene.

14. The rubber composition according to claim 2, wherein the conjugated diene/aromatic vinyl copolymeric rubber further comprises polymerized units of at least one selected from the group consisting of (meth)acrylonitrile, vinylidene cyanide, vinyl chloride, vinylidene chloride, (meth) acrylamide, maleimide, methyl(meth)acrylate, ethyl (meth)acrylate, n-propyl (meth)acrylate, isopropyl (meth)acrylate, n-butyl (meth)acrylate, iso-butyl (meth)acrylate, sec-butyl (meth)acrylate, ter-butyl (meth)acrykate, n-amyl (meth)acrylate, n-hexyl (meth)acrylate, 2-ethylhexyl (meth)acrylate and cyclohexyl (meth)acrylate.

15. The rubber composition according to claim 2 wherein said conjugated diene/aromatic vinyl copolymeric rubber comprises polymerized units of a monomer having one polymerizable unsaturated group and at least one fucntional group selected from the group consisting of carboxylic group, amino group, hydroxyl group, epoxy group and alkoxysilyl group, and is present in an amount of 0.1 to 30% by weight with respect to said conjugated diene/aromatic vinyl copolymeric rubber.

16. The rubber composition according to claim 15, wherein said monomer having on polymerizable unsaturated group at least one functional group is at least one selected from the group consisting of (meth)acrylic acid, maleic acid, fumaric acid, itaconic acid, tetraconic acid, cinnamic acid, monoesters of at least one selected from the group consisting of phthalic acid, succinic acid and adipic acid with (meth) allylalcohol or 2-hydroxyethyl (meth)acrylate, and salts thereof.

17. The rubber composition according to claim 2, further comprising at least one reinforcing filler selected from the group consisting of the inorganic compound represented by the formula (I), silica and carbon black $$mM_t \cdot xSiO_y \cdot zH_2O \tag{I}$$

wherein $M_t$ is at least one selected from the group consisting of Al, Mg, Ti, and Ca; an oxide thereof; and an hydroxide thereof; and m, x, y, and z are integers from 1 to 5, 0 to 10, 2 to 5, and 0 to 10 respectively.

18. The rubber composition according to claim 8, wherein the conjugated diene/aromatic vinyl copolymeric rubber comprises polymerized units of at least one amino group containing compound selected from the group consisting of dimethylaminomethyl (meth)acrylate, diethylaminomethyl (meth)acrylate, 2-diethylaminomethyl (meth)acrylate, 2-diethylaminomethyl (meth)acrylate, 2-diethylaminomethyl (meth)acrylate, 2-diethylaminomethyl (meth)acrylate, 2-(di-n-propylamino) ethyl (meth)acrylate, 2-dimethylaminopropyl (meth) acrylate, 2-diethylaminopropyl (meth)acrylate, 2-(di-n-propylamino)propyl (meth)acrylate, 3-dimethylaminopropyl (meth)acrylate, 3-diethylaminopropyl (meth)acrylate, 3-(di-n-propylamino) propyl (meth)acrylate, N-dimethylaminomethyl (meth) acrylamide, N-diethylaminamethyl (meth)acrylamide, N-(2-dimethylaminoethyl) (meth)acrylamide, N-(2-diethylaminoethyl) (meth)acrylamide, N-(2-dimethylaminopropyl) (meth)acrylamide, N-(2-diethylaminopropyl) (meth)acrylamide, N-(3-dimethylaminopropyl) (meth)acrylamide, N-(3-diethylaminopropyl) (meth)acrylamide, N,N-dimethyl-p-aminostyren, N,N-diethyl-p-aminostyrene, dimethyl(p-vinylbenzyl)amine, diethyl(p-vinylbenzyl)amine, dimethyl (p-vinylphenethyl)amine, diethyl(p-vinylphenethyl)amine, dimethyl(p-vinylbenzyloxymethyl)amine, diethyl[2-(p-vinylbenzyloxy)ethyl] amine, diethyl(p-vinylbenzyloxymethyl)amine, diethyl[2-(p-vinylbenzyloxy) ethyl] amine, dimethyl(p-vinylphenethyloxymethyl)amine, dimethyl[2-(p-vinylphenethyloxy)ethyl]amine, diethyl(p-vinylphenethyloxymethyl)amine, diethyl[2-(p-vinylphenethyloxy)ethyl]amine, 2vinylpyridine, 3-vinylpyridine and 4-vinylpyridine.

19. The rubber composition according to claim 8, wherein the conjugated diene/aromatic vinyl copolymeric rubber comprises polymerized units of a hydroxyl containing compound selected from the group consisting of a 2-hydroxyethyl (meth)acrylate, a 2-hydroxypropyl (meth) acrylate, a 3-hydroxypropyl (meth)acrylate, a 2-hydroxybutyl (meth)acrylate, a 3-hydroxybutyl (meth) acrylate, 4-hydroxybutyl (meth)acrylates, a mono (meth) acrylate of polyethylene glycol having from 2 to 23 ethylene glycol units, a mono (meth)acrylate of polypropylene glycol having from 2 to 23 propylene glycol units, N-hydroxymethyl (meth)acrylamide, N-(2-hydroxyethyl) (meth)acrylamide, N,N-bis(2-hydroxyethyl) (meth) acrylamide, o-hydroxystyrene, m-hydroxystyrene, p-hydroxystyrene, o-hydroxy-α-methylstyrene, m-hydroxy-α-methylstyrene, p-hydroxy-α-methylstyrene p-vinylbenzyl alcohol and (meth)allyl alcohol.

20. The rubber composition according to claim 8, wherein the conjugated diene/aromatic vinyl copolymeric rubber comprises polymerized units of an epoxy group containing compound selected from the group consisting of (meth) allyglycidylether, glycidyl (meth)acrylate and 3,4-oxycyclohexyl (meth)acrylate.

21. The rubber composition according to claim 8, wherein the conjugated diene/aromatic vinyl copolymeric rubber comprises polymerized units of an alkoxysilane containing compound selected from the group consisting of (meth) acryloxymethyl trimethoxysilane, (meth)acryloxymethly methyldimethoxysilane, (meth)acryloxymethl dimethylmethoxysilane, (meth)acryloxymethl triethoxysilane, (meth)acryloxymethly methyldiethoxysilane, (meth)acryloxymethyl dimethylethoxysilane, (meth)acryloxymethyl tripropoxysilane, (meth)acryloxymethyl methyldipropoxysilane, (meth)acryloxymethyl dimethylpropoxysilane, γ-(meth)acryloxypropyl trimethoxysilane, γ-(meth)acryloxpropyl methyldimethoxysilane, γ-(meth)acryloxypropyl dimethylphenoxysilane, γ-(meth)acryloxypropyl triethoxysilane, γ-(meth)acryloxypropyl mehyldiethoxysilane, γ-(meth)acryloxpropyl dimethylphhoxysilane, γ-(meth)acryloxpropyl tripropoxysilane, γ-(meth)acryloxypropyl methyldipropoxysilane, γ-(methacryloxypropyl dimethylpropoxysilane, γ-(meth)acryloxypropyl methyldiphenoxysilane, γ-(meth)aacryloxypropyl dimethylphenoxysilane, γ-(meth)acryloxypropyl methyldibenzyloxysilane and γ-(meth)acryloxypropyl dimethylphenoxysilane.

22. The rubber composition according to claim 2, wherein the monomer unit (b4) is at least one selected from the group condidting of (meth)acrylic acid, maleic acid, fumaric acid, itaconic acid, tetraconic acid, cinnamic acid, a monoester of phthalic acid, succinic acid and adipic acid with (meth allylalcohol or 2-hydroxyethyl (meth)acrylate, and salts thereof.

23. The rubber composition according to claim 2, wherein the monomer unit (b4) is at least one selected from the group consisting of a 2-hydroxyethyl (meth)acrylate, a 2-hydroxypropyl (meth)acrylate, a 3-hydroxypropyl (meth) acrylate, a 2-hydroxybutyl (meth)acrylate, a 3-hydroxybutyl (meth)acrylate, a 4-hydroxybutyl (meth)acrylate, a mono (meth)acrylate of polyethylene glycol having 2 to 23 ethylene glycol units, a mono (meth)acrylate of polypropylene glycol having 2 to 23 propylene glycol units, N-hydroxymethyl (meth)acrylamide, N-(2-hydroxyethyl) (meth)acrylamide, N,N-bis(2-hydroxyethyl) (meth) acrylamide, o--hydroxystyrene, m-hydroxystyrene, p-hydroxystyrene, o-hydroxy-α-methylstyrene, m-hydroxy-α-methylstyrene, p-hydroxy-α-methylstyrene p-vinylbenzyl alcohol and (meth)allyl.

24. The rubber composition according to claim 2, wherein the monomer unit (b4) is at least one selected from the group consisting of (meth)allylglycidylether, glycidyl (meth) acrylate and 3,4-oxycyclohexyl (meth)acrylate.

25. The rubber composition according to claim 15, wherein the monomer having one polymerizable unsaturated group and at least one functional group is at least one selected from the group consisting of dimethylaminomethyl (meth)acrylate, diethylaminomethyl (meth)acrylate, 2-dimethylaminoethyl (meth)acrylate, 2-diethylaminoethyl (meth)acrylate, 2-dimethylaminoethyl (meth)acrylate, 2-diethylaminoethyl (meth)acrylate, 2-(di-n-propylamino) ethyl (meth)acrylate, 2-dimethylaminopropyl (meth) acrylate, 2-diethylaminopropyl (meth)acrylate, 2-(di-n-propylamino)propyl (meth)acrylate, 3-dimethylaminopropyl (meth)acrylate, 3-diethylaminopropyl (meth)acrylate, 3-(di-n-propylamino) propyl (meth)acrylate, N-dimethylaminomethyl (meth) acrylamide, N-diethylaminamethyl (meth)acrylamide, N-(2-dimethylaminoethyl) (meth)acrylamide, N-(2-diethylaminoethyl) (meth)acrylamide, N-(2-dimethylaminopropyl) (meth)acrylamide, N-(2-diethylaminopropyl) (meth)acrylamide, N-(3-dimethylaminopropyl) (meth)acrylamide, N-(3-diethylaminopropyl) (meth)acrylamide, N,N-dimethyl-p-aminostyrene, N,N-diethyl-p-aminostyrene, dimethyl(p-vinylbenzyl)amine, diethyl(p-vinylbenzyl)amine, dimethyl (p-vinylphenethyl)amine, diethyl(p-vinylphenethyl)amine, dimethyl(p-vinylbenzyloxymethyl)amine, diethyl[2-(p-vinylbenzyloxy)ethyl]amine, diethyl(p-vinylbenzyloxymethyl)amine, diethyl[2-(p-vinylbenzyloxy) ethyl]amine, dimethyl(p-vinylphenethyloxymethyl)amine, dimethyl[2-(p-vinylphenethyloxy)ethyl]amine, diethyl(p-vinylphenethyloxymethyl)amine, diethyl[2-(p-vinylphenethyloxy)ethyl]amine, 2-vinylpyridine, 3-vinylpyridine and 4-vinylpyridine.

26. The rubber composition according to claim 15, wherein the monomer having one polymerizable unsaturated group and at least one functional group is at least one selected from the group consisting of a 2-hydroxyethyl (meth)acrylate, a 2-hydroxypropyl (meth)acrylate, a 3-hydroxypropyl (meth)acrylate, a 2-hydroxybutyl (meth) acrylate, a 3-hydroxybutyl (meth)acrylate, a 4-hydroxybutyl (meth)acrylate, a mono (meth)acrylate of polyethylene glycol having from 2 to 23 ethylene glycol units, a mono (meth)acrylate of polypropylene glycol having form 2 to 23 propylene glycol units, N-hydroxymethyl (meth) acrylamide, N-(2-hydroxyethyl) (meth)acrylamide, N,N-bis (2-hydroxyethyl) (meth)acrylamide, o-hydroxystyrene, m-hydroxystyrene, p-hydroxystyrene, o-hydroxy-α-methylstyrene, m-hydroxy-α-methylstyrene, p-hydroxy-α-methylstyrene p-vinylbenzyl alcohol and (meth)allyl alcohol.

27. The rubber composition according to claim 15, wherein the monomer having one polymerizable unsaturated group and at least one functional group is at least one selected from the group consisting of (meth) allylglycidylether, glycidyl (meth)acrylate and 3,4-oxycyclohexyl (meth)acrylate.

28. The rubber composition according to claim 15, wherein the monomer having one polymerizable unsaturated group and at least one functional group is at least one selected from the group consisting of (meth)acryloxymethyl trimethoxysilane, (meth)acryloxymethyl methyldimethoxysilane, (meth)acryloxymethyl dimethylmethoxysilane, (meth)acryloxymethyl triethoxysilane, (meth)acryloxymethyl methyldiethoxysilane, (meth)acryloxymethyl dimethylethoxysilane, (meth)acryloxymethyl tripropoxysilane, (meth)acryloxymethyl methyldipropoxysilane, (meth)acryloxymethyl dimethylpropoxysilane, γ-(meth)acryloxypropyl trimethoxysilane, γ-(meth)acryloxypropyl methyldimethoxysilane, γ-(meth)acryloxypropyl dimethlphenoxysilane, γ-(meth)acryloxypropyl triethoxysilane, γ-(meth)acryloxypropyl methyldiethoxysilane, γ-(meth)acryloxypropyl dimethylphhoxysilane, γ-(meth)acryloxypropyl tripropoxysilane, γ-(meth)acryloxypropyl methyldipropoxysilane, γ-(meth)acryloxypropyl dimethylpropoxysilane, γ-(meth)acryloxypropyl methyldiphenoxysilane, γ-(meth)acryloxypropyl dimethylphenoxysilane, γ-(meth)acryloxypropyl methyldibenzyloxysilane and γ-(meth)acryloxypropyl dimethylphenoxysilane.

29. The rubber composition according to claim 2, wherein the carboxylic group is a $CO_2H$ or a $CO_2^-$ group.

30. The rubber composition according to claim 8, wherein the carboxylic group is a $CO_2H$ or a $CO_2^-$ group.

31. The rubber composition according to claim 15, wherein the carboxylic group is a $CO_2H$ or a $CO_2^-$ group.

32. A tire comprising the rubber composition according to claim 1.

33. A tire comprising the rubber composition according to claim 2.

* * * * *